United States Patent
Inaguchi (10) Patent No.: US 9,890,573 B2
(45) Date of Patent: Feb. 13, 2018

(54) SLIDING DOOR OF MACHINE TOOL

(71) Applicant: FANUC Corporation, Yamanashi (JP)

(72) Inventor: Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 197 days.

(21) Appl. No.: 14/632,408

(22) Filed: Feb. 26, 2015

(65) Prior Publication Data

US 2015/0252604 A1  Sep. 10, 2015

(30) Foreign Application Priority Data

Mar. 4, 2014 (JP) ................. 2014-041526

(51) Int. Cl.
| | |
|---|---|
| *E05D 15/06* | (2006.01) |
| *E06B 1/04* | (2006.01) |
| *E06B 5/00* | (2006.01) |
| *F16P 1/02* | (2006.01) |
| *E05D 15/08* | (2006.01) |

(52) U.S. Cl.
CPC ..... *E05D 15/0652* (2013.01); *E05D 15/0656* (2013.01); *E06B 1/04* (2013.01); *E06B 5/00* (2013.01); *F16P 1/02* (2013.01); *E05D 15/08* (2013.01); *E05Y 2201/684* (2013.01); *E05Y 2600/46* (2013.01); *E05Y 2900/608* (2013.01)

(58) Field of Classification Search
CPC . B23Q 11/0825; E06B 3/4636; E05D 15/063; E05D 15/0652; E05D 15/0656
See application file for complete search history.

(56) References Cited

U.S. PATENT DOCUMENTS

| | | | | |
|---|---|---|---|---|
| 1,538,358 | A | * | 5/1925 | Schultz ................. E06B 3/4636 49/125 |
| 1,570,762 | A | * | 1/1926 | McTigue .............. E05D 15/063 16/96 R |
| 2,815,543 | A | * | 12/1957 | Gates .................. E05D 15/0656 16/95 R |

(Continued)

FOREIGN PATENT DOCUMENTS

| | | |
|---|---|---|
| CN | 203592354 U | 5/2014 |
| DE | 3513944 C2 | 8/1987 |

(Continued)

OTHER PUBLICATIONS

Office Action dated Oct. 27, 2015, corresponding to Japanese Patent Application No. 2014-041526.

(Continued)

*Primary Examiner* — Katherine W Mitchell
*Assistant Examiner* — Catherine A Kelly
(74) *Attorney, Agent, or Firm* — Hauptman Ham, LLP (57) ABSTRACT

In a sliding door disposed in an opening of a cover surrounding a machine tool,
From among two adjacent door panels, at least one of sliding members of the door panel which is located closer to a door frame slides on a door frame guide track, whereas at least one of sliding members of the door panel which is located farther from the door frame slides on the door frame guide track, and at least one of the remaining sliding members slides on the door panel guide track. Thus, guide means can be prevented from projecting vertically.

4 Claims, 6 Drawing Sheets

(56) References Cited

U.S. PATENT DOCUMENTS

| | | | |
|---|---|---|---|
| 3,100,916 A * | 8/1963 | McKinney | E05D 15/0656 49/125 |
| 4,635,699 A | 1/1987 | Kauffman et al. | |
| 5,482,414 A * | 1/1996 | Hayashi | B23Q 11/0825 160/116 |
| 5,960,690 A | 10/1999 | Romi | |
| 6,254,076 B1 * | 7/2001 | Goldin | B23Q 11/0825 269/160 |
| 6,260,438 B1 * | 7/2001 | Tabellini | B23Q 11/0825 160/202 |
| 6,736,241 B2 * | 5/2004 | Miller | E05D 15/0652 16/94 R |
| 6,987,241 B2 * | 1/2006 | Hacker | B23Q 11/0825 160/222 |
| 7,174,944 B1 * | 2/2007 | Clark | E05D 15/063 16/96 R |
| 7,458,410 B1 * | 12/2008 | Bronner | E05D 15/0656 160/197 |
| 2002/0172570 A1 | 11/2002 | Tsurumaki | |
| 2007/0062122 A1 | 3/2007 | Polus | |

FOREIGN PATENT DOCUMENTS

| | | |
|---|---|---|
| DE | 69703684 T2 | 8/2001 |
| DE | 202007010177 U1 | 9/2007 |
| DE | 102007034101 A1 | 2/2008 |
| EP | 1589173 A2 | 10/2005 |
| GB | 284642 A | 2/1929 |
| JP | 58-60765 U | 4/1983 |
| JP | 62-127745 U | 8/1987 |
| JP | 6-8102 A | 1/1994 |
| JP | 2006-205337 A | 8/2006 |
| JP | 2014-223688 A | 12/2014 |

OTHER PUBLICATIONS

Office Action dated Sep. 1, 2015, corresponding to Japanese Patent Application No. 2014-041526.

Office Action in CN Application No. 201510094591.8, dated Dec. 27, 2016.

\* cited by examiner

SLIDING DOOR OF MACHINE TOOL

RELATED APPLICATIONS

The present application claims priority to Japanese Application Number 2014-041526, filed Mar. 4, 2014, the disclosure of which is hereby incorporated by reference herein in its entirety.

BACKGROUND OF THE INVENTION

Field of the Invention

The present invention relates to a sliding door of a machine tool, and more particularly, to a guide structure of a sliding door.

Description of the Related Art

A machine tool has a machining space in which a workpiece is placed and machined. In machining the workpiece, a cover may sometimes be provided to protect the workpiece itself and prevent chips produced during the workpiece machining and a coolant from scattering to the surrounding area.

Figure 1:
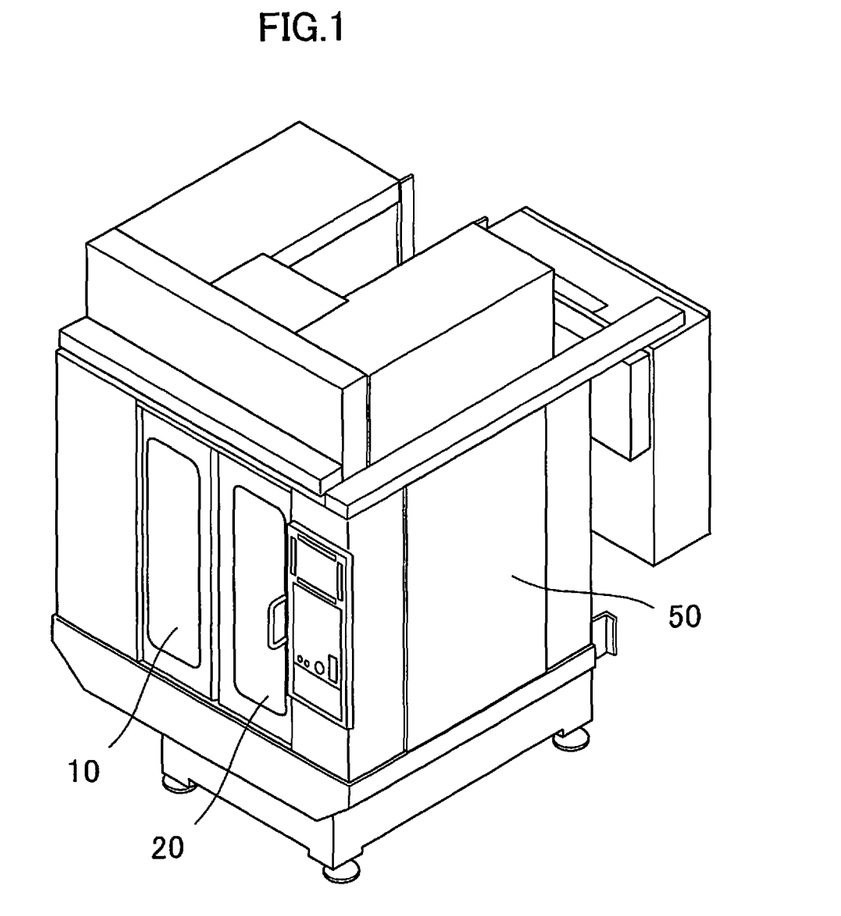
FIG. 1 is a perspective view of an entire machine tool.

FIG. 1 is a perspective view of an entire machine tool. The machine tool is provided therein with a machining space in which a workpiece (not shown) can be placed and its side surfaces are covered by a cover 50. Further, first and second slide-type doors 10 and 20 for workpiece loading/unloading and the like are arranged on the front side of the machine tool. In this machine tool, a two-tiered sliding door is used in order to handle large workpieces.

Japanese Patent Application Laid-Open No. 2006-205337 discloses a technique in which two sliding doors of a machine tool are arranged so that a second one of them is guided by a guide rail attached to the underside of a first one. Since guide means of the second door is located below that of the first door, according to this technique, the door may sometimes largely project downward from the lower end portion of its opening. Possibly, therefore, the door may interfere with an installation space for mechanism sections, such as a movable cover, saddle, etc., of the machine tool so that the opening width of the door cannot be increased.

Further, Japanese Utility Model Application Laid-Open No. 62-127745 discloses a technique in which each of two sliding doors of a machine tool is guided by a rail disposed in its center. Since both of the doors are guided by their respective center rails, according to this technique, they may possibly interfere with each other or may increased in overall thickness.

SUMMARY OF THE INVENTION

Accordingly, the object of the present invention is to provide a sliding door disposed in an opening of a cover surrounding a machine tool and configured for an increased door opening width.

A sliding door according to the present invention is disposed in an opening of a cover surrounding a machine tool and comprises a door frame and at least two door panels (doors) disposed inside the machine tool with respect to the door frame. The door frame comprises a door frame guide track (rail). From among those door panels, one of the at least two adjacent door panels, which is located closer to the door frame, comprises a door panel guide track, one of the door panels, which adjoins the door frame, comprises at least one sliding member configured to slide on the door frame guide track, and the door panel which does not adjoin the door frame comprises at least two sliding members. And, from among the sliding members of the door panel which does not adjoin the door frame, at least one sliding member is configured to slide on the door frame guide track, and at least one of the remaining sliding members is configured to slide on the door panel guide track.

According to the present invention, at least one of the sliding members of the door panel which is located farther from the door frame is configured to slide on the door panel guide track, not on the door frame guide track. Thus, every sliding member of the door panel which is located farther from the door frame can be prevented from projecting vertically by being slid on the door frame guide track. Consequently, a vertical space for the installation of the guide means can be reduced.

The door frame guide track may be a single track configured to guide sliding members of a plurality of door panels.

The sliding member configured to slide on the door frame guide track may be attached to a side end of an opening of the door panel.

In this aspect, the sliding member configured to slide on the door frame guide track is disposed at the side end of the opening of the door panel so that the position where the sliding member of the door panel slides on the door frame guide track is located at the end of the opening. Thus, the opening width can be prevented from being reduced.

The two door panels may be substantially equal in guide height.

According to the present invention, there can be provided a sliding door of a machine tool configured for an increased door opening width.

BRIEF DESCRIPTION OF THE DRAWINGS

The above and other objects and features of the present invention will be obvious from the ensuing description of embodiments with reference to the accompanying drawings, in which:

FIGS. 2A and 2B are perspective views showing an example of a guide structure of one embodiment of a sliding door of a machine tool according to the present invention, in which

FIGS. 3A to 3F are views illustrating details of the guide structure of the sliding door shown in FIGS. 2A and 2B, in which

FIGS. 4A and 4B are schematic views showing a prior art sliding door and its surroundings, in which

FIGS. 5A, 5B and 5C are views illustrating a guide structure of the prior art sliding door, in which FIGS. 6A and 6B are perspective views showing an example of the guide structure of the prior art sliding door, in which

DETAILED DESCRIPTION OF THE PREFERRED EMBODIMENTS

A conventional technique related to a sliding door of a machine tool and its problems will be described first.

Figure 6A:
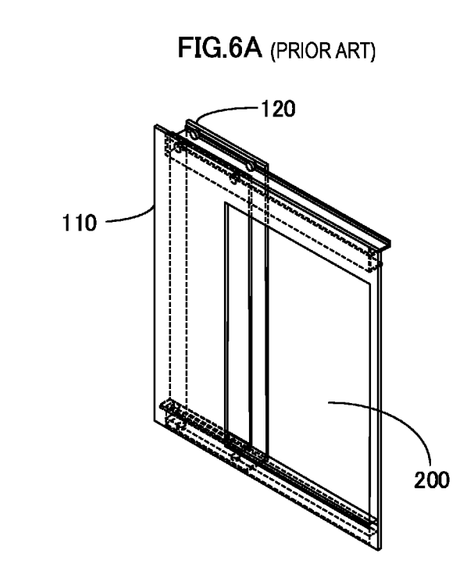
FIG. 6A shows an open state of the door and FIG. 6B shows a closed state of the door.
Figure 6B:
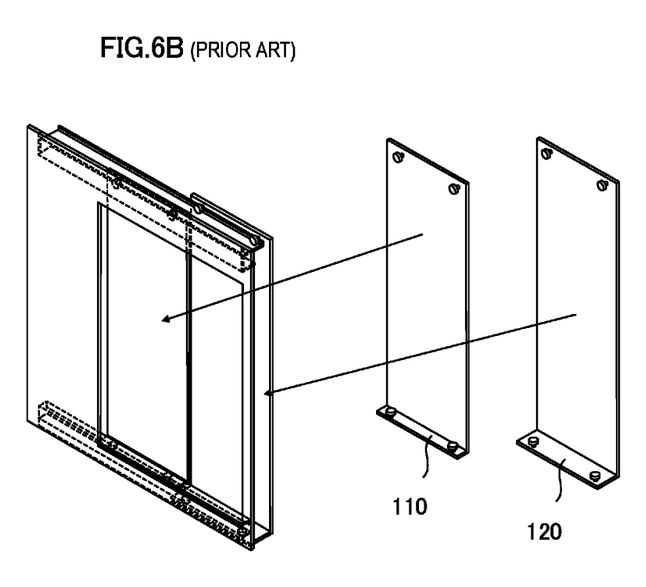

An example of a guide structure of the sliding door of the machine tool according to the conventional technique will first be described with reference to FIGS. 6A and 6B. FIGS. 6A and 6B show an open state and a closed state, respectively, of the door.

As shown in FIG. 6B, the sliding door comprises a first door 110 and a second door 120, both of which are slidable. When the sliding door is in the open state, as shown in FIG. 6A, the first and second doors 110 and 120 overlap each other to leave an opening 200 through which a workpiece (not shown) to be machined can be loaded into and unloaded from the machine tool. When the sliding door is in the closed state, in contrast, the first and second doors 110 and 120 hardly overlap each other so that the opening 200 is closed, as shown in FIG. 6B.

Figure 4A:
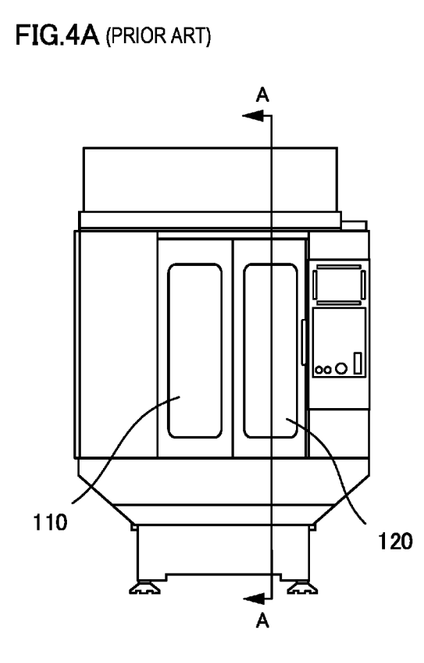
FIG. 4A is a front view and FIG. 4B is a sectional view taken along line A-A of FIG. 4A.
Figure 4B:
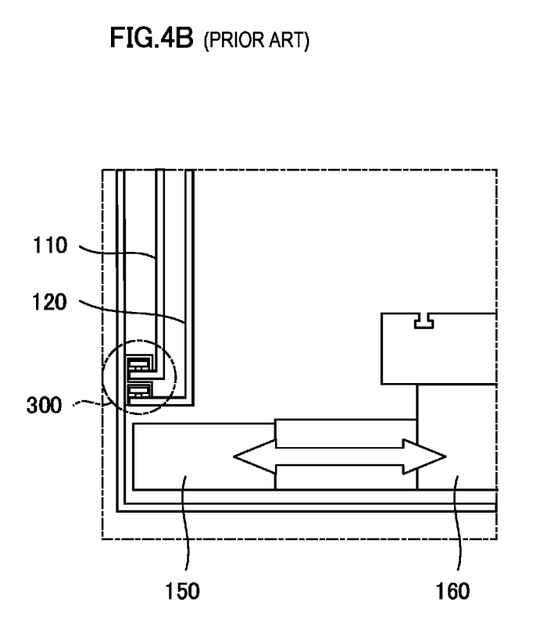

A structure in the vicinity of guide means of the prior art sliding door will now be described with reference to FIGS. 4A and 4B.

As is also shown in FIGS. 6A and 6B, a front sliding door section comprises the first and second doors 110 and 120. As shown in FIG. 4B, moreover, a cover 150 and a saddle 160 are disposed at the lower part of the machine tool. The cover 150 is movable in the front-rear direction of the machine tool (i.e., horizontal direction in FIG. 4B). As shown in FIG. 4B, a door guide portion 300 for the first and second doors 110 and 120 is configured so that a guide unit of the second door 120 is located below that of the first door 110. The door guide portion 300 will be described in detail later.

Figure 5A:
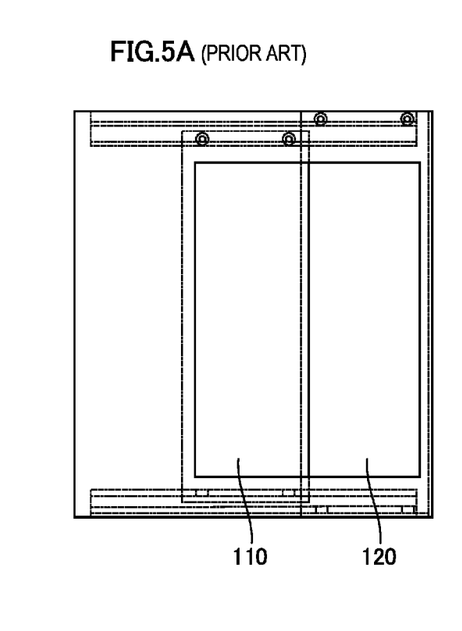
FIG. 5A is a front view.

The guide structure of the sliding door according to the conventional technique will now be described with reference to FIGS. 5A, 5B and 5C.

A door frame 140 is located on the front side (left-hand side of FIG. 5B) of the sliding door structure as viewed from its front. The first and second doors 110 and 120 are inwardly arranged from the side of the door frame 140 in the order named, as shown in FIG. 5B.

At the lower part of the sliding door structure, moreover, the door frame 140 is provided with first and second lower rails 112a and 112b that are arranged vertically in parallel relation to each other. On the other hand, the first and second doors 110 and 120 are provided with first and second lower door rollers 132a and 132b, respectively. The first and second lower rails 112a and 112b guide the first and second lower door rollers 132a and 132b, respectively.

At the upper part of the sliding door structure, as in the case of the lower part, the door frame 140 is provided with first and second upper rails 114a and 114b that are arranged vertically in parallel relation to each other. On the other hand, the first and second doors 110 and 120 are provided with first and second upper door rollers 134a and 134b, respectively. The first and second upper rails 114a and 114b guide the first and second upper door rollers 134a and 134b, respectively.

Figure 5B:
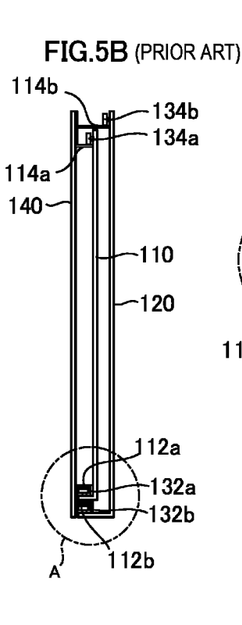
FIG. 5B is a sectional view.
Figure 5C:
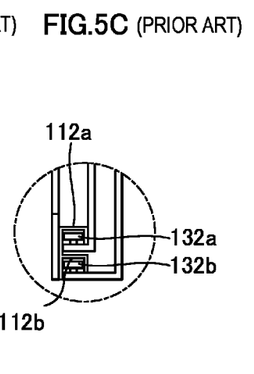
FIG. 5C is an enlarged view of a lower guide portion of FIG. 5C.

In the prior art sliding door constructed in this manner, as shown in FIGS. 5B and 5C, the second lower rail 112b is located below the first lower rail 112a, and the second lower door roller 132b is located below the first lower door roller 132a, at the lower part of the sliding door structure. Possibly, therefore, the sliding door may largely project downward and interfere with mechanism sections, such as the cover 150 and the saddle 160 (see FIG. 4B). Thus, the opening width of the sliding door cannot be increased, in some cases.

The present invention has been made to solve these problems. The following is a description of one embodiment of the sliding door of the machine tool according to the present invention.

An example of a guide structure of the one embodiment of the sliding door of the machine tool according to the present invention will first be described with reference to FIGS. 2A and 2B.

Figure 2A:
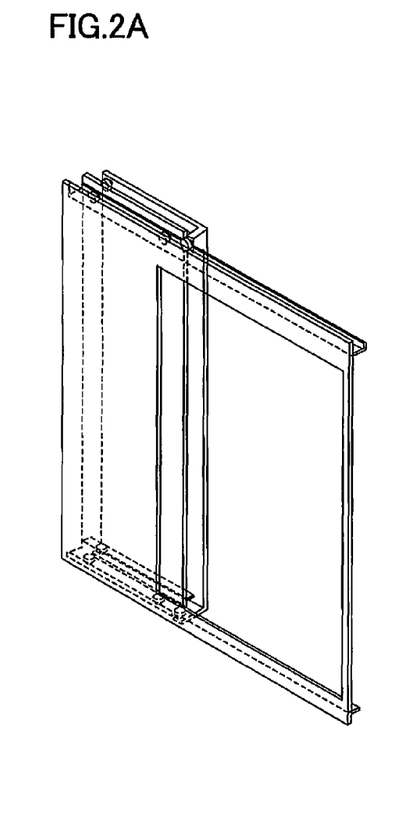
FIG. 2A shows an open state of the sliding door and FIG. 2B shows a closed state of the door.
Figure 2B:
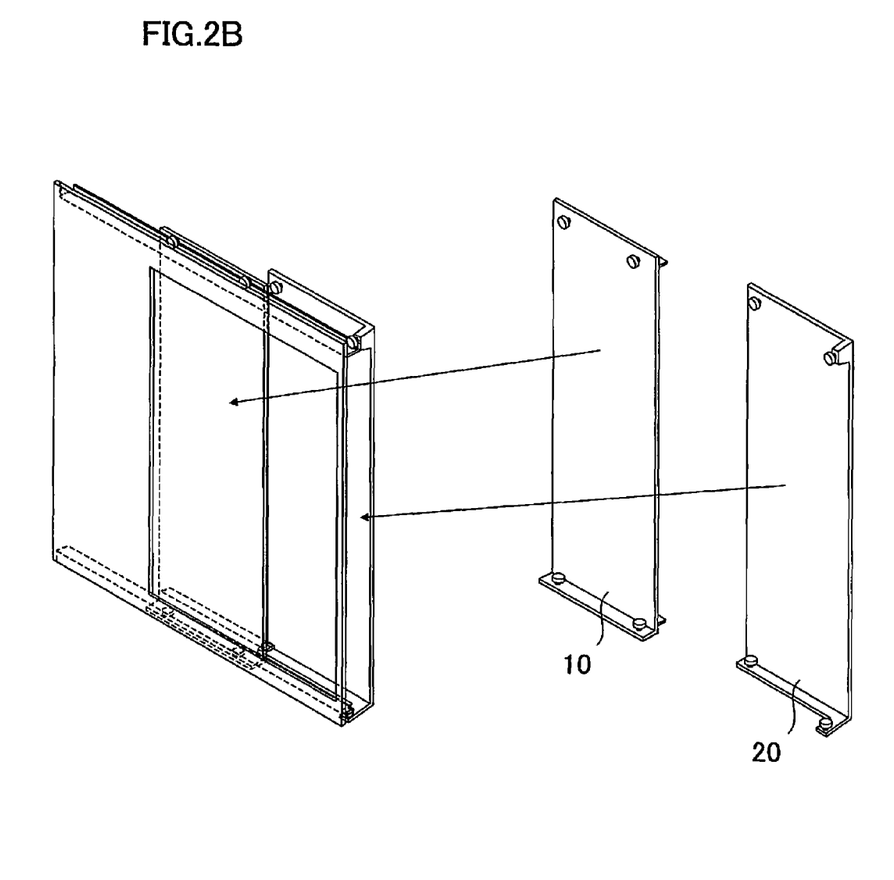

Although the sliding door shown in FIGS. 2A and 2B is similar to the prior art sliding door shown in FIGS. 6A and 6B, the guide structures of these two sliding doors are different from those shown in shown in FIGS. 6A and 6B.

The guide structure of the sliding door shown in FIGS. 2A and 2B will now be described in detail with reference to FIGS. 3A to 3F.

A door frame 40 is located on the front side (left-hand side of FIG. 5B or right-hand side of FIG. 3D) of the sliding door structure as viewed from its front. A first door 10 and a second door 20 are inwardly arranged from the side of the door frame 40 in the order named, as shown in FIG. 3B.

At the lower part of the sliding door structure, moreover, the door frame 40 is provided with a first lower rail 12 (single rail dissimilar to the two-tiered rail structure shown in FIG. 5B). The first door 10 is provided with a first lower door roller 32a as well as a second lower rail 22. Further, the second door 20 is provided with a second lower door roller 32b on its left-hand side as viewed from its front. The first lower rail 12 of the door frame 40 guides the first lower door roller 32a of the first door 10, while the second lower rail 22 of the first door 10 guides the second lower door roller 32b of the second door 20.

Figure 3A:
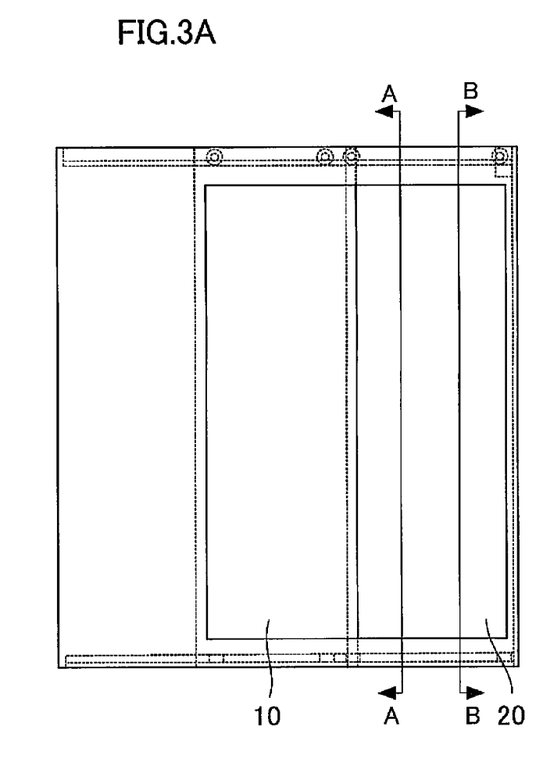
FIG. 3A is a front view.
Figure 3B:
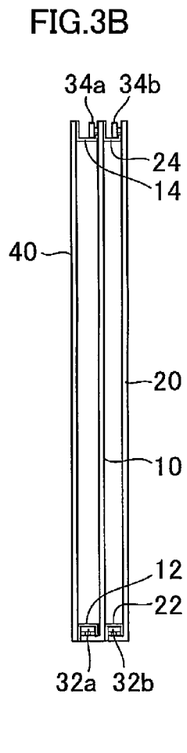
FIG. 3B is a sectional view.
Figure 3C:
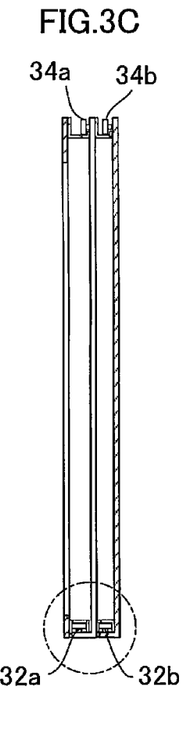
FIG. 3C is a sectional view taken along line A-A of FIG. 3A and from the right-hand side of FIG. 3A.
Figure 3D:
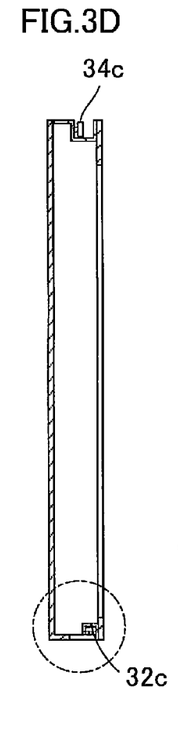
FIG. 3D is a sectional view taken along line B-B of FIG. 3A and from the left-hand side of FIG. 3A.
Figure 3E:
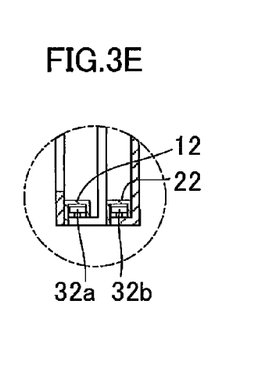
FIG. 3E is an enlarged view of a lower guide portion of FIG. 3C.
Figure 3F:
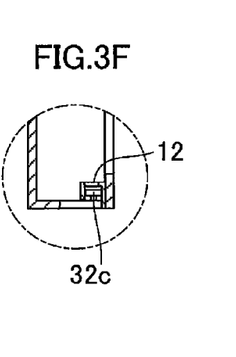
FIG. 3F is an enlarged view of a lower guide portion of FIG. 3D.

The second door 20 is further provided with a third lower door roller 32c on its right-hand side as viewed from its front, as shown in FIGS. 3D and 3F. The first lower rail 12 of the door frame 40 guides the third lower door roller 32c of the second door 20. The third lower door roller 32c is configured to form a side end of the opening of the sliding door.

At the upper part of the sliding door structure, as in the case of the lower part, the door frame 40 is provided with a first upper rail 14, as shown in FIG. 3B. The first door 10 is provided with a first upper door roller 34a as well as a second upper rail 24. Further, the second door 20 is provided with a second upper door roller 34b on its left-hand side as viewed from its front. The first upper rail 14 of the door frame 40 guides the first upper door roller 34a of the first door 10, while the second upper rail 24 of the first door 10 guides the second upper door roller 34b of the second door 20.

The second door 20 is further provided with a third upper door roller 34c on its right-hand side as viewed from its front, as shown in FIG. 3D. The first upper rail 14 of the door frame 40 guides the third upper door roller 34c of the second door 20. The third upper door roller 34c is configured to form a side end of the opening of the sliding door.

According to the configuration described above, the rails and door rollers that constitute guide members for guiding the first and second doors 10 and 20 are equal in height. Thus, large upward or downward projection of the sliding door, which may be caused by the presence of rails and door rollers arranged vertically in parallel relation, as in the conventional technique, is eliminated. Consequently, a vertical space for the installation of guide means and the like can be reduced.

According to this configuration, the third lower and upper door rollers 32c and 34c on the right-hand side of the second door 20 are guided by the first lower and upper rails 12 and 14, respectively, of the door frame 40. Inevitably, therefore, the first lower and upper rails 12 and 14 interfere with the sliding range of the first door 10. In some cases, therefore, the first and second doors 10 and 20 can not be opened until they entirely overlap each other, as a result, the opening width may be reduced. In case where a rubber cushion, knob, control arrangement, etc., are attached to any of the doors, however, the opening width has been already restricted for securing an installation space for them. Thus, the opening width cannot be particularly reduced despite the configuration of the present embodiment.

In the present embodiment, the rails and door rollers are used as the members for guiding the doors. However, these members may be replaced with linear-motion guides (LM guides), such as slide packs, and their blocks.

While the two doors are used in the configuration of the present embodiment described above, three or more doors may alternatively be used in a door configuration comprising a series of similar structures. In the case of a three-door configuration in which first, second, and third door panels are successively arranged with distance from the door frame, for example, one of door rollers of the second door panel slides on a rail attached to the door frame, while the other door roller slides on a rail attached to the first door panel. Further, one of door rollers of the third door panel is configured to slide on a rail attached to the door frame, and the other door roller to slide on a rail attached to the second door panel.

The invention claimed is:

1. A sliding door disposed in an opening of a cover surrounding a machine tool, the sliding door comprising:
a door frame; and
at least two door panels located inside the machine tool with respect to the door frame, wherein
the door frame comprises a lower door frame guide track,
the at least two door panels comprise a first door panel and a second door panel,
the first door panel is located closer to the door frame than the second door panel, and comprises
a lower door panel guide track, and
at least one sliding member configured to slide on a vertical surface of the lower door frame guide track,
the second door panel comprises at least two lower sliding members,
the at least two lower sliding members of the second door panel comprise
at least one first lower sliding member configured to slide on the vertical surface of the lower door frame guide track, and
at least one second lower sliding member configured to slide on a vertical surface of the lower door panel guide track.

2. The sliding door to claim 1, wherein the lower door frame guide track is a single track configured to guide the at least one sliding member of the first door panel and the at least one first lower sliding member of the second door panel.

3. The sliding door to claim 1, wherein
the second door panel has a first side end and a second side end which are opposite to each other,
the first side end is closer to the opening than the second side end when the sliding door is at an open state and the opening is opened, and
the at least one first lower sliding member is attached to the first side end of the second door panel.

4. The sliding door to claim 1, wherein the at least two door panels are substantially equal in guide height.

* * * * *